Nov. 9, 1937.  J. T. GOLTMAN ET AL  2,098,658
SYRINGE
Filed Feb. 28, 1935

Witnesses:

Inventors:
John T. Goltman,
John W. Robbins,
By Joshua R. H. Potts
their Attorney.

Patented Nov. 9, 1937

2,098,658

UNITED STATES PATENT OFFICE 2,098,658

SYRINGE

John T. Goltman, Clinton, and John W. Robbins, Davenport, Iowa, assignors to Applicator Products Corporation, Clinton, Iowa, a corporation of Iowa Application February 28, 1935, Serial No. 8,604

6 Claims. (Cl. 128—231)

This invention relates to improvements in syringes and the like.

An object has been to provide an improved syringe which will prevent liquid and the like from gaining access to the common rubber bulb or other compressible member used in syringes. It is a well-known fact that liquids work their way up into the compressible members of syringes, and in addition to corroding the same and rendering the device short-lived, much liquid is wasted. To overcome this disadvantage we have provided an arrangement of a syringe having a plunger which renders it impossible for a liquid to gain access to the plunger and also eliminates wastage of liquids or other materials.

An object has also been to provide a device of this kind which is relatively simple in structure and assembly and inexpensive to produce.

These and other objects and advantages will be more apparent hereinafter.

Our invention may be best understood by reference to the accompanying drawing, in which.

Figure 1:
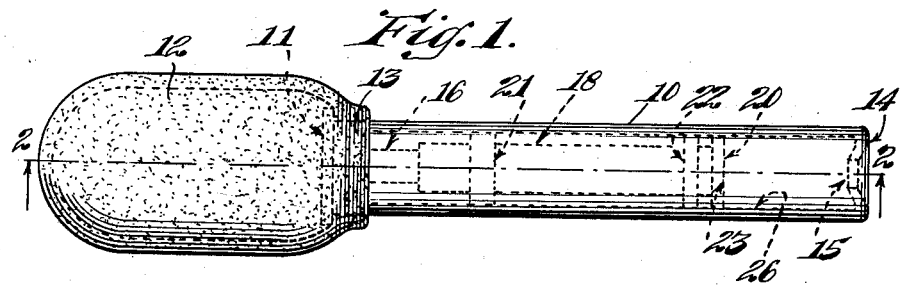
Fig. 1 is a front elevation of the device.
Figure 2:
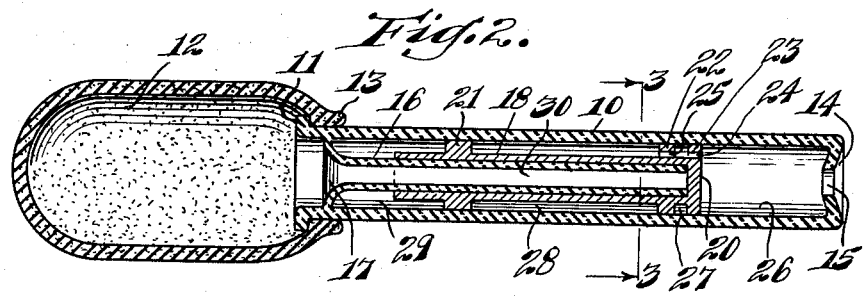
Fig. 2 is a sectional view on the line 2—2 of Fig. 1.

The preferred form of our invention which has been selected for illustrating the principle thereof comprises a glass tube 10 having at one end a flange 11, particularly shown in Figs. 1 and 2, about which tube 10 and against which flange 11 a common rubber bulb 12 having a neck 13 is adapted to be positioned. At the other end the glass tube has an inclined flange 14 provided with a central aperture 15. Integrally and interiorly formed in the tube 10 is a glass tube 16 by means of integrally flared portions 17.

Figures 4, 5:
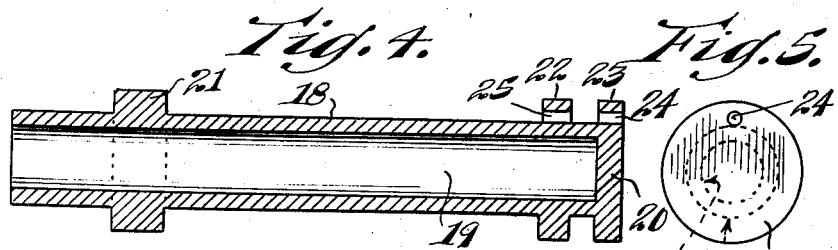
Fig. 4 is an enlarged sectional view of the reciprocating plunger.
Fig. 5 is an enlarged end view of the plunger.
Figure 3:
Fig. 3 is an enlarged sectional view on the line 3—3 of Fig. 2.

Adapted to reciprocate between the tubes 10 and 16 is a reciprocating plunger 18 shown in detail in Fig. 4. The plunger has a bore 19 and a closed end 20. The circumference of the bore 19 is only very slightly larger than the outer circumference of the tube 16 to allow the plunger 18 to fit upon the tube 16. The plunger 18 is provided with sealing flanges 21, 22, and 23, and two of these flanges are provided in the form shown with port holes, there being a port hole 24 in flange 23 and a port hole 25 in flange 22. These flanges extend to the tube 10, and a workable, tight sliding fit is made between the plunger and tubes 10 and 16, as will be well understood by those skilled in the art.

The end 20 of the plunger and the flange 23 and the end of the tube 10 form a chamber 26 as shown in Figs. 1 and 2, and the flanges 22 and 23 have between them a chamber 27, and the flanges 21 and 22 have between them a chamber 28, as will be seen clearly from Fig. 2, and the flange 21 and the flared portion 17 form another chamber 29. It will be understood that there is a bore 30 in the tube 16.

With respect to the operation of the device, when the tube of the device as shown in the condition of Figs. 1 and 2 is compressed, air from the tube will force the plunger to the right as shown in Figs. 1 and 2 and force the air from chamber 26. If the device has been inserted into a liquid and then the tube is allowed to expand the liquid will be drawn up into the chamber 26, as will be manifest. When it is desired to expel the liquid, the tube 12 may be compressed, and the liquid will be expelled. It will be seen that by the means we have provided it will be impossible for a liquid to work its way into the rubber bulb 12. In order for liquid to reach the bulb it would be necessary first for the liquid to work around the flange 23 and into the chamber 27, and thence around the flange 22 into the chamber 28, and thence around the flange 21 into the chamber 29. It would then be necessary for the liquid to work between the plunger 18 and the tube 16 to the closed end 20 of the plunger, and it would then be necessary for the liquid to work upwardly through the tube 16. By means of the structure provided including the flanges and the close-fitting workable sliding relationship between the parts, as will be manifest to those skilled in the art, it will be as a practical matter impossible for liquid to gain access to the rubber bulb 12. The port holes 24 and 25 are not necessary by any means. If it should be found that a small amount of liquid should work its way into the chamber 27 or the chamber 28, the port holes may serve to allow the liquid to work its way back into the chamber 26 and out of the device.

While we have shown three flanges, the flanges may be of any number greater or less than provided, and in fact the plunger body might be made to completely seal off the space between the tube 16 and the tube 10 instead of using flanges, and other modifications of the plunger might be made to accomplish the same purpose.

While we have illustrated and described the preferred form of construction for carrying our invention into effect, this is capable of variation and modification without departing from the spirit of the invention. We, therefore, do not wish to be limited to the precise details of construction set forth, but desire to avail ourselves of such variations and modifications as come within the scope of the appended claims.

Having thus described our invention, what we claim as new and desire to secure by Letters Patent is:

1. In a device of the kind described, an exterior tube, an interior tube secured in said exterior tube and having its walls spaced from the walls of said exterior tube, and means to prevent liquid from said exterior tube entering said interior tube, said means comprising a reciprocating plunger inclosed within said exterior tube and adapted to reciprocate between the walls of said tubes and form a closure for said interior tube.

2. In a device of the kind described an exterior tube, a tubular plunger therein having a closed end and adapted to effect a seal therewith, and an interior tube extending into said tubular plunger and adapted to provide a seal therewith.

3. In a device of the kind described, an exterior tube, an interior tube having its interior chamber sealed from the chamber of the exterior tube, and a reciprocating plunger in said exterior tube substantially inclosing said interior tube and adapted to effect said seal.

4. In a device of the kind described, an exterior tube, an interior open end tube having one end secured to said exterior tube and providing a seal therewith, and an elongated hollow plunger adapted to telescope and form a closure for the opposite end of said interior tube and provide a double seal between said tubes.

5. A device of the character described comprising an exterior tube, an interior tube extending into said exterior tube in substantial spaced relation thereto and having an open end within said exterior tube, and a plunger cap for said open end, said plunger having a tubular extending portion adapted to reciprocate between the walls of said exterior and interior tubes and form a double seal therebetween.

6. A device of the character described comprising a tubular member having a bulb attached at one end and an orifice at the other end, an elongated hollow plunger in said tubular member and adapted to provide a seal therewith, an elongated tubular member secured in said first tubular member and having one end thereof flared out and sealed to said first tubular member adjacent the said bulb end thereof, said inner tubular member being substantially the length of said plunger and adapted to extend into and provide a seal with the inner walls thereof, whereby said plunger is reciprocable by fluid pressure from said bulb.

JOHN T. GOLTMAN.
JOHN W. ROBBINS.